(12) United States Patent
Song et al.

(10) Patent No.: US 10,912,433 B2
(45) Date of Patent: Feb. 9, 2021

(54) MOBILE ROBOT

(71) Applicant: SHENZHEN FLY RODENT DYNAMICS INTELLIGENT TECHNOLOGY CO., LTD., Shenzhen (CN)

(72) Inventors: Zhangjun Song, Shenzhen (CN); Weiping Wang, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 393 days.

(21) Appl. No.: 16/021,022

(22) Filed: Jun. 28, 2018

(65) Prior Publication Data

US 2019/0200823 A1 Jul. 4, 2019

(30) Foreign Application Priority Data

Jan. 4, 2018 (CN) .......................... 2018 1 0007886

(51) Int. Cl.
*A47L 9/00* (2006.01)
*A47L 11/40* (2006.01)
*A47L 11/24* (2006.01)
*A47L 11/162* (2006.01)
*A47L 9/30* (2006.01)
*B25J 11/00* (2006.01)
(Continued)

(52) U.S. Cl.
CPC .............. *A47L 9/009* (2013.01); *A47L 9/30* (2013.01); *A47L 11/162* (2013.01); *A47L 11/24* (2013.01); *A47L 11/4011* (2013.01); *A47L 11/4013* (2013.01); *A47L 11/4058* (2013.01); *A47L 2201/04* (2013.01); *A47L 2201/06* (2013.01); *B25J 5/007* (2013.01); *B25J 11/0085* (2013.01); *B25J 19/023* (2013.01); *G05D 1/0088* (2013.01); *G05D 1/0246* (2013.01)

(58) Field of Classification Search
None
See application file for complete search history.

(56) References Cited

U.S. PATENT DOCUMENTS

2014/0132722 A1* 5/2014 Martinez Bauza ...... G06T 7/521
348/46
2018/0168417 A1* 6/2018 Goddard ................. A47L 11/24
(Continued)

OTHER PUBLICATIONS

HIPR2 (found at http://homepages.inf. ed.ac.uk/rbf/HIPR2/mean. htm, attached as pdf) (Year: 2017).*

*Primary Examiner* — Brian D Keller
(74) *Attorney, Agent, or Firm* — IPro, PLLC

(57) ABSTRACT

A mobile robot includes a body, a driving system connected to the body and configured to drive the mobile robot move on ground, a detecting module supported by the body and a controller received in the body. The detecting module includes a light source emitting light towards the ground, and a light sensor configured to obtain characteristic information and a shutter value of an image of the ground. The controller is configured to adjust the intensity of the light source according to the characteristic information of the image and monitor conditions of the ground according to the shutter value, which can accurately detect conditions of the ground and prevent misjudgment of the mobile robot.

18 Claims, 3 Drawing Sheets

(51) Int. Cl.
G05D 1/02 (2020.01)
G05D 1/00 (2006.01)
B25J 19/02 (2006.01)
B25J 5/00 (2006.01)

(56) References Cited

U.S. PATENT DOCUMENTS

2019/0025850 A1* 1/2019 Park .......................... A47L 9/30
2019/0072975 A1* 3/2019 Choi .................... B25J 11/0085
2019/0155277 A1* 5/2019 Ozmen ................ A01K 1/0128

* cited by examiner

MOBILE ROBOT

BACKGROUND

1. Technical Field

The present disclosure generally relates to daily living utensils field, and especially relates to a mobile robot.

2. Description of Related Art

Nowadays, there are various kinds of mobile robots, such as vacuuming robots, sweeping robots, mopping robots, family companion robots, robot receptionists, remote monitoring robots and so on. A conventional mobile robot can detect conditions of ground by an infrared ground detecting module which includes an infrared transmitter tube configured to emit infrared light towards the ground and an infrared receiver tube configured to receive infrared light reflected from the ground.

In an actual usage, when the infrared transmitter tube of the infrared ground detecting module emits infrared light towards the ground, if a signal intensity of the infrared ray reflected from the ground and received by the infrared receiver tube is greater than a fixed threshold, it is considered that the mobile robot encounters a normal ground. While, if a signal intensity of the infrared ray reflected from the ground and received by the infrared receiver tube is less than the fixed threshold, or the infrared ray reflected by the ground is not received by the infrared receiver tube, it is considered that the mobile robot encounters a ground with a height difference (such as cliffs, steps, etc.).

However, when the ground is provided with a black blanket or has a low reflection rate, since the infrared ray emitted by the infrared transmitter tube is mostly absorbed by the black felt or the ground itself, there is very little infrared light reflected into the infrared receiver tube. In this condition, it's possible to be considered that a mobile robot encounters a ground with a height difference so that avoidance behaviors (such as backward, turning directions, etc.) are adopted, thereby resulting in the inability to move to the ground area that is misjudged as having a height difference.

SUMMARY

The technical problems to be solved: in view of the shortcomings of the related art, the present disclosure relates to a mobile robot which can accurately detect conditions of the ground and prevent misjudgment thereof.

The present disclosure provides the advantages as below.

The structure of the present disclosure includes a body, a diving system connected to the body and configured for driving the mobile robot to move on ground, a detecting module supported by the body and a controller received in the body. The detecting module includes a light source emitting light towards the ground, and a light sensor configured to obtain characteristic information and a shutter value of an image of the ground. The controller is configured to adjust the intensity of the light source according to the characteristic information of the image and monitor conditions of the ground according to the shutter value, which can accurately detect conditions of the ground and prevent misjudgment of the mobile robot.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

Figure 1:
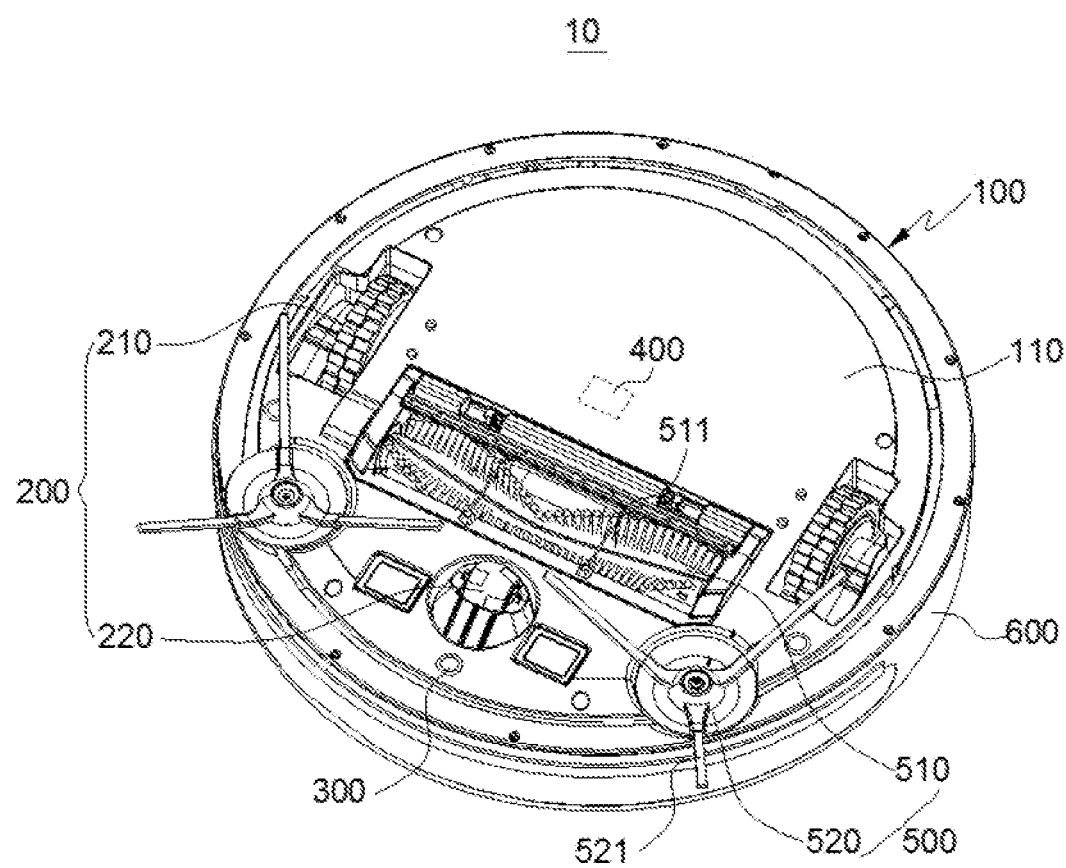
FIG. 1 is a bottom schematic view of the mobile robot configured to clean the ground in accordance with an exemplary embodiment.

The disclosure is illustrated by way of example and not by way of limitation in the figures of the accompanying drawings, in which like reference numerals indicate similar elements.

The mobile robot in accordance with an exemplary embodiment of the present disclosure is provided. The mobile robot can include but not limited to a mobile robot for remote monitoring, a mobile robot used for personal care, a mobile robot for ground cleaning, a remote toy mobile robot, a mobile robot for human-computer interaction, etc. In the present disclosure, a mobile robot used for ground cleaning is taken as an example for illustration.

Figure 2:
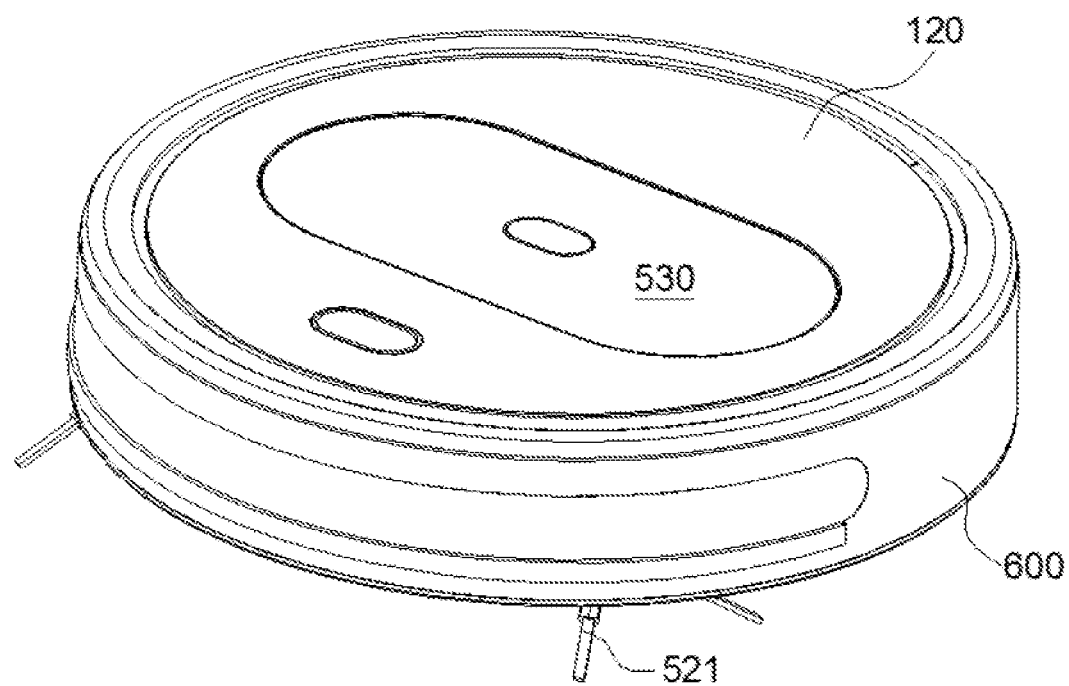
FIG. 2 is a front schematic view of the mobile robot of FIG. 1.

FIG. 1 is a bottom schematic view of the mobile robot 10 configured to clean the ground in accordance with an exemplary embodiment, and FIG. 2 is a front schematic view of the mobile robot 10 of FIG. 1. Referring to FIG. 1, the mobile robot 10 includes a body 100, a driving system 200, a detecting module 300, a controller 400 and a cleaning system 500.

In an exemplary embodiment of the present disclosure, the body 100 includes a chassis 110 and a housing 120 detachably mounted on the chassis 110. The chassis 110 and/or the housing 120 are configured to carry and support a plurality of functional components received within the mobile robot 10 so as to protect the plurality of functional components from severe impact or accidental damage of liquid dripping during usage.

The mobile robot 10 further includes a collision sensing device (not shown) formed on at least one part of the outer periphery of the body 110. In an exemplary embodiment of the present disclosure, the collision sensing device includes a collision portion 600 surrounding around the outer periphery of the body 100, a sensor and elastic member respectively connected between the body 100 and the collision portion 600. The sensor and the elastic member are respectively connected between the body 100 and the collision portion 600, including but not limited to the following situations: 1) The sensor and the elastic member are located between the body 100 and the collision portion 600; 2) The sensor and the elastic member are installed on the body 100, but a part of the sensor and the elastic member are located between the body 100 and the collision portion 600; 3) The sensor and the elastic member are installed on the collision portion 600, but a part of the sensor and the elastic member are located between the body 100 and the collision portion 600; 4) The sensor and the elastic member are installed on the collision portion 600 and the body 100. The elastic member is configured to maintain a uniformly movable gap between the collision portion 600 and the body 100 and the sensor is configured to sense a relative displacement between the collision portion 600 and the body 100. The sensor can be selected from one or more of micro-actuated switches, hall switches and infrared photoelectric switches. A plurality of sensors are formed between the body 100 and the collision portion 600, for example, at least one sensor is uniformly located between the collision portion 600 and the body 100 formed at a front or two sides of the mobile robot 10. The sensor is electrically connected to a controller 400, a processor or a controlling system located in the mobile robot 10 so as to control the mobile robot 10 perform a corresponding action according to data collected from the sensor. Because the body 100 is surrounded by the collision portion 600, the relative displacement between the collision portion 600 and the body 100 can be occurred no matter which part of the collision portion 600 collides with obstacles during the movement of the mobile robot 10. The mobile robot 10 can sense a collision of the obstacle because the sensor can sense the relative displacement between the collision portion 600 and the body 100. In this way, the mobile robot 10 can change its movement direction to bypass an impaction obstacle or take other countermeasures.

The driving system is connected to the body 100 and configured to drive the mobile robot 10 to move on the ground. For example, the mobile robot 10 can be designed to autonomously plan its path on the ground or can be designed to move on the ground in response to a remote command. In an exemplary embodiment of the present disclosure, the driving system 200 includes a pair of wheels 210, least one universal wheel 220 and a motor (not shown) for driving the pair of wheels 210 respectively rotation. At least one part of the pair of wheels 210 and the universal wheel 220 is extended out of a bottom of the chassis 110. For example, the pair of wheels 210 can be partially hidden in the chassis 110 under the weight of the mobile robot 10 itself. In another exemplary embodiment of the present disclosure, the driving system 200 can include any of triangular crawler wheels and McNamm wheels.

The cleaning system 500 includes a middle sweeping assembly 510, a lateral brush member 520 and a dust collecting box 530 detachably mounted on the body 100. The middle sweeping assembly 510 includes a roller brush 511 protruding outward from the bottom of the body 100, and a first motor (not shown) received within the body 100 and configured to drive the roller brush 511 to rotate. The lateral brush member 520 includes a lateral brush 521 formed on the bottom of the body 100, and a second motor (not shown) received within the body 100 and configured to drive the lateral brush 521 to rotate, with at least one part of the lateral brush 521 extending out of an outer contour of the body 100. When the mobile robot 10 moves on the ground, the first motor can drive the roller brush 511 to rotate to guide garbage on the ground into the dust collecting box 530. The lateral brush 521 is beneficial to effectively clean the edges of walls, corners and obstacles. The cleaning system 500 further includes a dust collection module 540 (see FIG. 4) within the body 100, at the same time, a fan of the dust collection module 540 is provided for applying a suction force for vacuuming ground garbage into the dust collecting box 530 from a suction port opened on the chassis 110.

Figure 3:
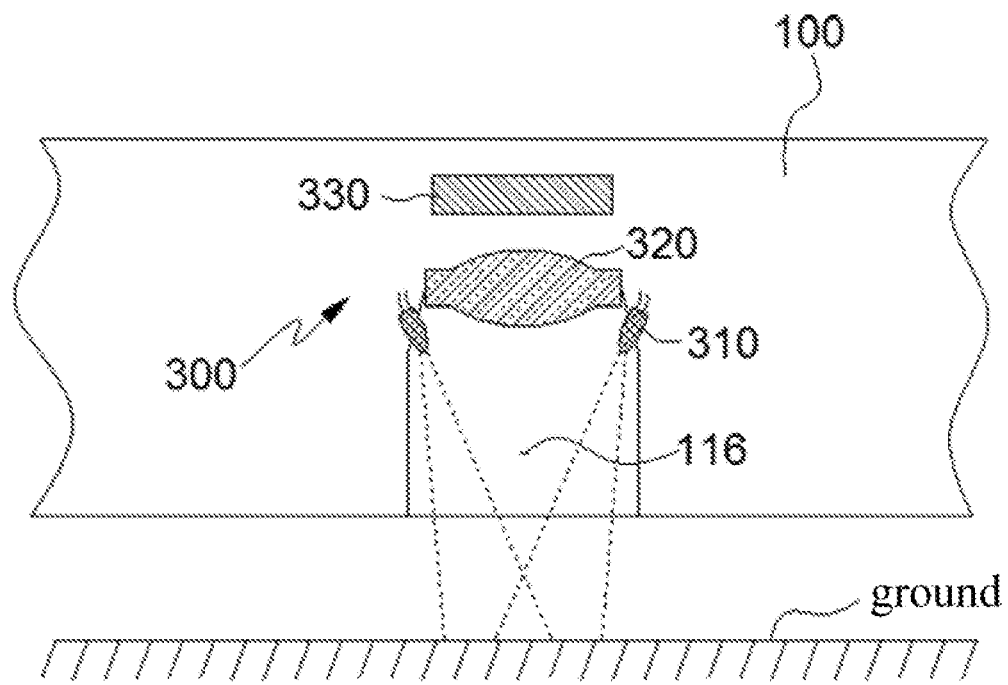
FIG. 3 is schematic view of a detecting module positioned on a bottom of a body of the mobile robot of FIG. 1.

Referring to FIG. 3, the detecting module 300 is supported by the body 100 and can optionally include an optical range camera (such as mouse cameras) to capture images of the ground below the mobile robot 10. In an exemplary embodiment of the present disclosure, the detecting module 300 includes a light source 310, an optional lens 320 and a light sensor 330. In another exemplary embodiment of the present disclosure, the detecting module 300 can be received in a recess 116 formed on the bottom of the body 100.

The detecting module 300 can include one or more light sources 310 configured to emit light towards the ground and illuminate the ground within the field of view of the detecting module 300. The light source 310 can be an LED for emitting visible or infrared light, etc. The one or more light sources 310 can be located on a same side of the light sensor 330, but this layout can easily lead to uneven lighting on the ground and shadows on the illuminated ground. So, in a preferred embodiment of the present disclosure, a plurality of light sources 310 is uniformly arranged on two opposite sides of or around the light sensor 330 to capture a more clear and accurate image of the ground.

The optical lens 320 is configured to enlarge the image of the ground when the light reflected off the ground is passing therethrough. The optical lens 320 can also be selected from a telecentric lens or a regular convex lens. In an actual usage, the ground that the mobile robot 10 walks may be uneven, thereby resulting in the captured image of the ground to be largely defocused and unclear. Therefore, a depth of field range of the optical lens 320 can span a certain distance range, for example, with a depth of field range from 20 mm to 40 mm. In this way, the image of the ground is controlled to an acceptable level of defocus within the distance range of the depth of field.

The light sensor 330 is configured to obtain characteristic information and a shutter value of the image of the ground. In the exemplary embodiment of the present disclosure, the characteristic information of the image includes, but not limited to, any one of the grayscale of the image and the quality of the image, or a combination of the two above.

In general, the light sensor 330 includes a photosensitive element and an electronic shutter, in other words, the photosensitive element is also called an image sensor for converting optical images into digital signals. The photosensitive element can be a CCD sensor or a CMOS sensor.

The automatic Electronic Shutter (AES, Auto Electronic Shutter) is configured to automatically adjust an effective exposure time of the photosensitive element based on the grayscale or quality of the ground image, the shutter value is configured to represent the effective exposure time of the photosensitive element in seconds. For example, the higher the grayscale of the image on the ground, the greater the shutter value, and the smaller the grayscale of the image on the ground and the smaller the shutter value. For example, the quality of the image on the ground, is worse, the shutter value is greater, while the quality of the image on the ground is better, the shutter value is smaller.

The controller 400 is configured to adjust the intensity of the light source according to the characteristic information of the image and monitor conditions of the ground according to the shutter value. For example, the characteristic information of the image includes the grayscale of the image and the quality of the image.

Under the condition of the characteristic information of the image including the grayscale of the image, the controller 400 can be configured to determine whether the grayscale value of the image is lower than a preset grayscale threshold. If the grayscale value of the image is lower than the preset grayscale threshold, the light source 310 is adjusted to become stronger, while, if the grayscale value of the image is higher than the preset grayscale threshold, the light source 310 is adjusted to become weaker. Thus the grayscale value of the image can be kept within an acceptable range. In another exemplary embodiment of the present disclosure, a grayscale average value can be calculated according the grayscale of the image on the ground obtained multiple times, and then the intensity of the light source 310 can be adjusted according to the grayscale average value. For example, the grayscale average value can be calculated using a mean filtering algorithm.

Under the condition of the characteristic information of the image including the quality of the image, the controller 400 can be configured to determine whether the quality of the image is lower than a preset quality level. If the quality value of the image is lower than the preset quality level, the light source 310 is adjusted to become stronger, while, if the quality value of the image is higher than the preset quality level, the light source 310 is adjusted to become weaker. Thus, the quality value of the image can be kept within an acceptable range. In another exemplary embodiment of the present disclosure, a quality average value can be calculated according to the quality of the image on the ground obtained multiple times, and then the intensity of the light source 310 can be adjusted according to the quality average value. For example, the quality average value can be calculated using a filtering algorithm.

In a practical application scenario of the mobile robot 10, factors influencing the shutter value include the color of the ground, the height of the detecting module 300 from the ground, etc. The mobile robot 10 is now directly placed on the ground with four typical colors, such as a white ground, a yellow ground, a wine-red ground, a black ground. In this condition, the value of Sh obtained by the light sensor 330 is respectively read. At the same time, the detecting module 300 of the mobile robot 10 is also directly placed on the ground, such as the white ground, the yellow ground, the wine-red ground, the black ground, respectively, with a 8 cm height above the four typical grounds, and then the controller 400 respectively read the value of Sh from the light sensor 330. The value of Sh read above is respectively entered in table 1 below, the value of Sh table 1 is in linear relation to an actual shutter value, for example, shutter value=0,8*Sh (μs).

troller 400 is configured to monitor a height difference of the ground if the shutter value is greater than a critical threshold so as to control the mobile robot 10 to perform an evasive action.

It can be seen in table 1, when the detecting module 300 is at a distance of 8 cm from the ground, the value of Sh is significantly greater than the value of Sh that the mobile robot 10 is directly placed on the ground. For example, the value of Sh at a distance of 8 cm from the white ground is significantly greater than the value of Sh that it is directly placed on the black ground. Based on this rule, for example, the critical threshold can be selected from a arrange of 1200 to 1400, if the value of Sh is greater than the critical threshold, If the value of Sh is greater than the critical threshold, the height difference of the monitored ground is determined. At this time, the controller 400 can control the mobile robot 10 to perform an evasive action which includes backward and turning directions.

In another exemplary embodiment of the present disclosure, the controller 400 is configured to monitor the condition of the ground based on the shutter value obtained at first, the shutter value obtained later, and the difference between the two shutter values. The shutter value obtained at first and the shutter value obtained hater are based on a chronological order. For example, 1) Under a height difference condition: the mobile robot 10 encounters a certain color cliff ground with a height difference when moving on a certain color ground, the shutter value obtained at first is measured by the detecting module 300 based on the reflection of the certain color ground, and the shutter value obtained later is measured by the detecting module 300 based on the reflection of the certain color cliff ground; 2) Under a color change condition: the mobile robot 10 encounters another certain color ground when moving on a certain color ground, the shutter value obtained at first is measured by the detecting module 300 based on the reflection of the certain color ground, and the shutter value obtained later is measured by the detecting module 300 based on the reflection of the another certain color ground.

TABLE 1

|    | white ground | 8 cm height above the white ground | yellow ground | 8 cm height above the yellow ground | wine-red ground | 8 cm height above the wine-red ground | black ground | 8 cm height above the black ground |
|----|---|---|---|---|---|---|---|---|
| Sh | 380 | 1562 | 400 | 1944 | 680 | 3031 | 1092 | 3503 |
|    | 380 | 1562 | 400 | 1823 | 638 | 3031 | 1092 | 3721 |
|    | 380 | 1556 | 400 | 1936 | 677 | 3220 | 1088 | 3489 |
|    | 380 | 1459 | 400 | 1928 | 674 | 3019 | 1156 | 3707 |
|    | 380 | 1550 | 400 | 1808 | 632 | 3007 | 1084 | 3476 |
|    | 380 | 1454 | 400 | 1921 | 671 | 3194 | 1151 | 3463 |
|    | 380 | 1544 | 400 | 1801 | 630 | 2995 | 1147 | 3679 |
|    | 380 | 1538 | 400 | 1794 | 628 | 3182 | 1076 | 3450 |
|    | 380 | 1442 | 400 | 1906 | 667 | 3170 | 1143 | 3665 |
|    | 380 | 1532 | 400 | 1787 | 667 | 2972 | 1072 | 3436 |
|    | 380 | 1437 | 400 | 1898 | 626 | 3157 | 1139 | 3422 |
|    | 380 | 1431 | 400 | 1780 | 665 | 2960 | 1134 | 3635 |
|    | 380 | 1520 | 400 | 1773 | 663 | 3145 | 1064 | 3408 |
|    | 380 | 1425 | 400 | 1883 | 663 | 3133 | 1130 | 3621 |
|    | 380 | 1514 | 400 | 1766 | 663 | 2938 | 1060 | 3607 |
|    | 380 | 1508 | 400 | 1876 | 663 | 3121 | 1056 | 3382 |
|    | 380 | 1602 | 400 | 1869 | 622 | 2926 | 1122 | 3593 |
|    | 380 | 1502 | 400 | 1985 | 660 | 2914 | 1052 | 3369 |
|    | 380 | 1595 | 400 | 1861 | 660 | 3096 | 1117 | 3356 |
|    | 380 | 1496 | 400 | 1745 | 660 | 2903 | 1112 | 3565 |

The controller 400 is configured to monitor the condition of the ground based on the shutter value. Specifically, in an exemplary embodiment of the present disclosure, the con- It can be seen in table 1, if the difference between the shutter value obtained at first and the shutter value obtained later is less than a first threshold (for example, the first threshold is 700) and the shutter value obtained later is less than second threshold (for example, the second threshold can be selected from the range between 1200 and 1400), so the color change of the ground can be determined. A gyro sensor (not shown) can be provided in the mobile robot 100 to detect color changes caused by the presence of a blanket. In a practical application scenario, the blanket has a certain thickness so that a front and a rear of the mobile robot 10 can be tilted during movement of the mobile robot 10 from the ground to the blanket. Based on this, weather pitch angle parameters of the gyro sensor change can be configured to determine whether the mobile robot 10 encounters the blanket. Specifically, if the pitch angle parameter of the gyro sensor is changed, it is judged that the mobile robot 10 has encountered the blanket, so that the controller 40 is configured to adjust a cleaning mode of the cleaning system 500.

In an exemplary embodiment of the present disclosure, the cleaning system 500 includes a dust collection module 540, and the cleaning mode of the cleaning system 500 can be adjusted by increasing the power of a fan in the dust collection module 540 so that the dust on the blanket can be more efficiently inhaled into the dust collector box 530. In another exemplary embodiment of the present disclosure, the cleaning system 500 further includes a middle sweeping assembly 510 and the cleaning mode that regulates the cleaning system 500 includes reducing the rotation speed of the middle sweeping assembly 510, or adjusting the first motor of the middle sweeping assembly 510 to stop rotating, thereby reducing the resistance of the blanket to the roller brush 511 and affecting the moving speed of the mobile robot 10.

Figure 4:
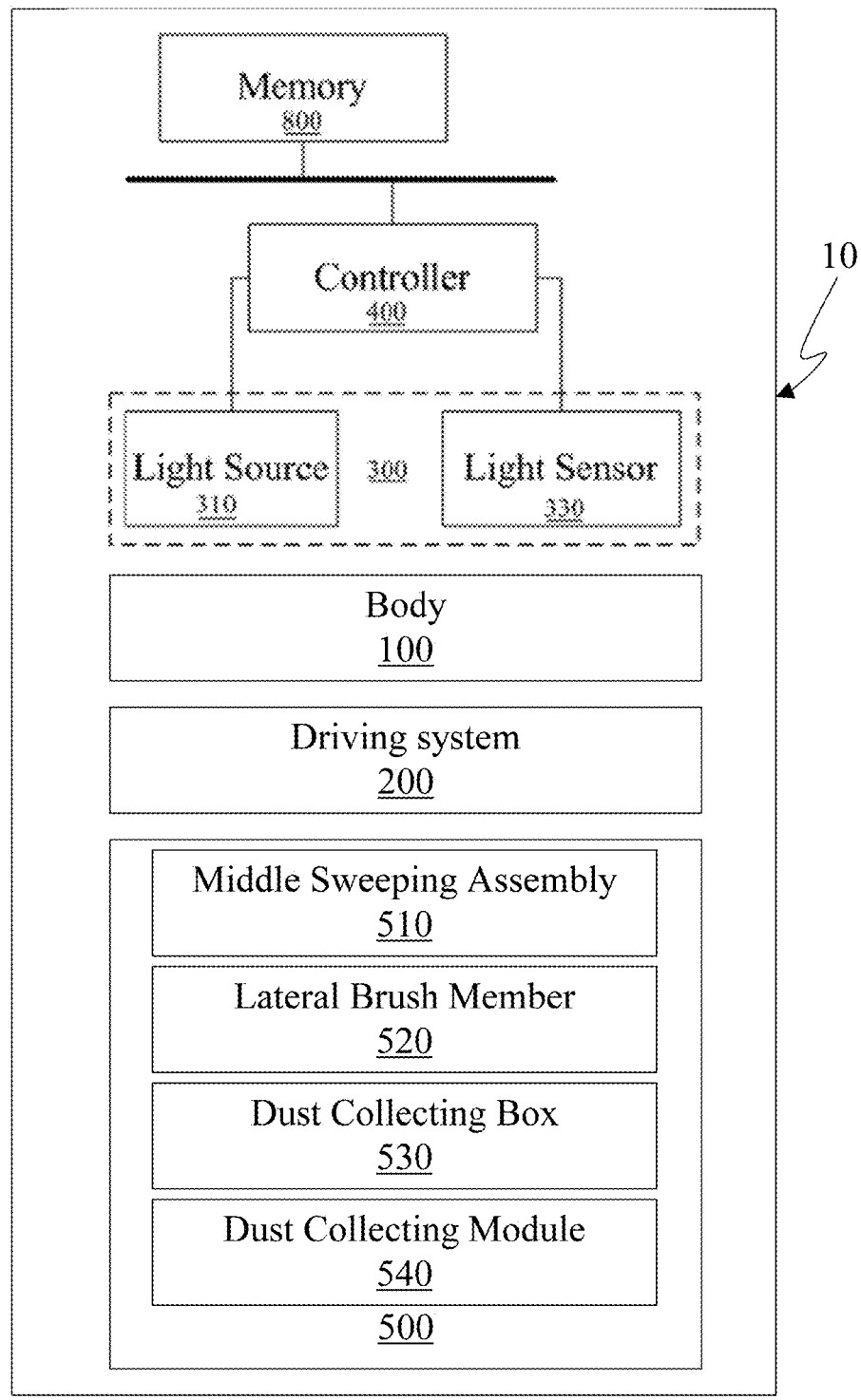
FIG. 4 is a circuit connection diagram of a controller, a memory and the detecting module of the mobile robot of FIG. 1.

Referring to FIG. 4, the controller 400 is electrically connected to the memory 800, the light source 310 and the light sensor 330 of the detecting module 300.

The controller 400 can include one or more combinations of micro-control units such as microcontroller, FPGA, ASIC, DSP, etc. In an exemplary embodiment of the present disclosure, the controller 400 is presented in a form of an integrated circuit. In other exemplary embodiment of the present disclosure, the controller 400 is presented in a form of an integrated circuit together with a periphery circuit.

The controller 400 and the memory 800 can be connected to each other via a bus or other means, FIG. 4 is shown the connection between them by a bus connection.

The memory 800, as a non-volatile computer readable storage medium, is configured to store non-volatile software programs and non-volatile computer executable programs. The controller 400 can perform various functional applications and data processing of the mobile robot 10 by running non-volatile software programs and instructions stored in the memory 800.

The memory 800 includes a storage program area configured to store applications of an operating system and at least one functional application, and a storage data area configured to store data created according to the use of the mobile robot 10. In addition, the memory 800 can include a high speed random access memory, a non-volatile memory, such as at least one disk storage device, a flash memory device and other non-volatile solid-state storage devices. In some embodiments of the present disclosure, the memory 800 can optionally include a memory remotely set relative to the controller 400, with the remote memory connecting to the controller 400 by networks. Examples of such networks include, but no limited to, the Internet, Intranet, LAN, mobile communication network and its combination.

The mobile robot 10 of the present disclosure includes the body 100, the driving system 200 connected to the body 100 and configured for driving the mobile robot 10 to move on ground, be detecting module 300 supported by the body 100 and a controller 400 received in the body 100. The detecting module 300 includes the light source 310 emitting light towards the ground, and the light sensor 330 configured to obtain characteristic information and a shutter value of an image of the ground. The controller 400 is configured to adjust the intensity of the light source 310 according to the characteristic information of the image and monitor the condition of the ground according to the shutter value, which can accurately detect the condition of the ground and prevent misjudgment of the mobile robot.

In the description of the specification of the present disclosure, the terms "one embodiment", "some embodiments", "an example", "an specific example", or "an alternative embodiment", etc., means that a particular feature, structure, material or characteristic described in connection with the embodiment or example is included in at least one embodiment or example of the present disclosure. In the specification of the present disclosure, the indicative representation of the above terms does not necessarily refer to the same embodiments or examples. Moreover, the description of the specific characteristic, structure, material, or feature can be combined in an appropriate manner in any one or more embodiments or examples.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A mobile robot comprising:
   a body;
   a driving system connected to the body and configured to drive the mobile robot to move on ground;
   a detecting module supported by the body and comprising at least one light source configured to emit light towards the ground, and a light sensor configured to obtain characteristic information and a shutter value of an image of the ground; and
   a controller configured to adjust an intensity of the at least one light source according to the characteristic information of the image, the controller configured to monitor conditions of the ground based on the shutter value obtained at first, the shutter value obtained later, and a difference between the two shutter values, and the controller configured to monitor color changes on the ground if the difference is less than a first threshold and the shutter value obtained later is less than a second threshold.

2. The mobile robot as claimed in claim 1, wherein the characteristic information of the image comprises grayscale of the image, and the controller is configured to adjust the intensity of the at least one light source to become stronger if the grayscale of the image is lower than a preset grayscale threshold.

3. The mobile robot as claimed in claim 1, wherein the characteristic information of the image comprises quality of the image, and the controller is configured to adjust the intensity of the at least one light source to become stronger if the quality of the image is below a preset quality level.

4. The mobile robot as claimed in claim 1, wherein the controller is configured to calculate an average value of the characteristic information of the image and then adjust the intensity of the at least one light source according to the average value.

5. The mobile robot as claimed in claim 4, wherein the controller is configured to calculate the average value of the characteristic information of the image using a mean filtering algorithm.

6. The mobile robot as claimed in claim 1, wherein the detecting module further comprises an optical lens configured to enlarge the image of the ground when the light reflected off the ground is passing therethrough.

7. The mobile robot as claimed in claim 1, wherein the controller is configured to monitor a height difference of the ground if the shutter value is greater than a critical threshold so as to control the mobile robot to perform an evasive action.

8. The mobile robot as claimed in claim 1, wherein the mobile robot is a robot cleaner which comprises a cleaning system and a gyro sensor, and the controller is further configured to adjust a cleaning mode of the cleaning system if a pitch angle parameter of the gyro sensor is mutated.

9. The mobile robot as claimed in claim 8, wherein the cleaning system comprises a dust collection module and the cleaning mode of the cleaning system is capable of being adjusted by increasing a power of the dust collection module.

10. The mobile robot as claimed in claim 8, wherein the cleaning system further comprises a middle sweeping assembly and the cleaning mode of the cleaning system is capable of being adjusted by reducing a rotation speed of the middle sweeping assembly.

11. A mobile robot comprising:
a body;
a driving system connected to the body and configured to drive the mobile robot to move on ground;
a detecting module supported by the body and comprising a light sensor configured to obtain characteristic information and a shutter value of an image of the ground and a plurality of light sources configured to emit light towards the ground and uniformly arranged on two opposite sides of or around the light sensor to capture an image of the ground;
a controller configured to adjust an intensity of the light sources according to the characteristic information of the image, the controller configured to monitor conditions of the ground based on the shutter value obtained at first, the shutter value obtained later, and a difference between the two shutter values, and the controller configured to monitor color changes on the ground if the difference is less than a first threshold and the shutter value obtained later is less than a second threshold; and
a cleaning system comprising a dust collection module and a middle sweeping assembly, cleaning modes of the cleaning system capable of being adjusted by increasing a power of the dust collection module and reducing a rotation speed of the middle sweeping assembly.

12. The mobile robot as claimed in claim 11, wherein the detecting module comprises an optical lens configured to enlarge the image of the ground when the light reflected off the ground is passing therethrough, the optical lens is selected from one of a telecentric lens and a regular convex lens with a depth of field range from 20 mm to 40 mm.

13. The mobile robot as claimed in claim 11, wherein the light sensor comprises an automatic electronic shutter, the automatic electronic shutter is configured to automatically adjust an effective exposure time of a photosensitive element of the light sensor based on grayscale or quality of the image of the ground, the shutter value is configured to represent the effective exposure time of the photosensitive element in seconds.

14. The mobile robot as claimed in claim 11, wherein the body comprises a chassis and a housing detachably mounted on the chassis, the chassis and/or the housing configured to carry and support a plurality of functional components received within the mobile robot so as to protect the plurality of functional components from severe impact or accidental dripping of liquid during use.

15. The mobile robot as claimed in claim 14, wherein the driving system comprises a pair of wheels, at least one universal wheel and a motor for driving the pair of wheels to respectively rotate, at least one part of the pair of wheels and the universal wheel extending out of a bottom of the chassis.

16. The mobile robot as claimed in claim 11, wherein the mobile robot further comprises a collision portion surrounding an outer periphery of the body, a sensor and an elastic member respectively connected between the body and the collision portion, the elastic member configured to maintain a uniformly movable gap between the collision portion and the body and the sensor configured to sense a relative displacement between the collision portion and the body.

17. The mobile robot as claimed in claim 11, wherein the middle sweeping assembly comprises a roller brush protruding outward from a bottom of the body, and a first motor received within the body and configured to drive the roller brush to rotate.

18. The mobile robot as claimed in claim 17, wherein the cleaning system further comprises a lateral brush member and a dust collecting box detachably mounted on the body, the lateral brush member comprising a lateral brush formed on the bottom of the body, and a second motor received within the body and configured to drive the lateral brush to rotate, at least one part of the lateral brush extending out of an outer contour of the body; when the mobile robot moves on the ground, the first motor is capable of driving the roller brush to rotate so as to guide garbage on the ground into the dust collecting box.

* * * * *